(12) United States Patent
Hachisuwa et al.

(10) Patent No.: US 12,203,537 B2
(45) Date of Patent: Jan. 21, 2025

(54) DAMPER DEVICE

(71) Applicants: TOYOTA JIDOSHA KABUSHIKI KAISHA, Toyota (JP); VALEO KAPEC JAPAN K.K., Atsugi (JP)

(72) Inventors: Isamu Hachisuwa, Nagoya (JP); Atsushi Muto, Toyota (JP); Takashi Fujita, Atsugi (JP); Kiyoshi Yamamoto, Ebina (JP)

(73) Assignees: TOYOTA JIDOSHA KABUSHIKI KAISHA, Toyota (JP); VALEO KAPEC JAPAN K.K., Atsugi (JP)

( * ) Notice: Subject to any disclaimer, the term of this patent is extended or adjusted under 35 U.S.C. 154(b) by 414 days.

(21) Appl. No.: 17/716,746

(22) Filed: Apr. 8, 2022

(65) Prior Publication Data

US 2022/0381327 A1  Dec. 1, 2022

(30) Foreign Application Priority Data

May 28, 2021 (JP) .................................. 2021-090047

(51) Int. Cl.
*F16H 45/02* (2006.01)
*F16F 15/123* (2006.01)

(52) U.S. Cl.
CPC ....... *F16H 45/02* (2013.01); *F16F 15/12353* (2013.01); *F16H 2045/0221* (2013.01); *F16H 2045/0284* (2013.01)

(58) Field of Classification Search
CPC ............. F16H 45/02; F16H 2045/0221; F16H 2045/0284; F16F 15/12353

USPC ....................... 464/68.9, 67.1; 192/3.28, 213
See application file for complete search history.

(56) References Cited

U.S. PATENT DOCUMENTS

| 5,025,904 | A  | * | 6/1991  | Graton ............... F16F 15/12353 |
| 6,354,420 | B1 | * | 3/2002  | Yabe ...................... F16H 45/02 |
|           |    |   |         | 192/3.28 |
| 7,955,178 | B2 | * | 6/2011  | Mu ................... F16F 15/12373 |
| 2016/0290462 | A1 |   | 10/2016 | Fujiwara et al. |
| 2018/0073594 | A1 |   | 3/2018  | Takikawa et al. |

FOREIGN PATENT DOCUMENTS

JP          2005-282651 A      10/2005

* cited by examiner

*Primary Examiner* — Greg Binda
(74) *Attorney, Agent, or Firm* — Finnegan, Henderson, Farabow, Garrett and Dunner, LLP

(57) ABSTRACT

A damper device includes an input-side rotating member, an intermediate rotating member, an output-side rotating member, and an elastic body. The elastic body is located in a clearance in a circumferential direction between each of a plurality of corresponding portions in which a hook portion of the input-side rotating member and a hook portion of the output-side rotating member face each other and the intermediate rotating member. A part of the corresponding portions is a first corresponding portion configured in such a manner that the elastic body is separated from the output-side rotating member and in contact with the input-side rotating member. The remainder of the corresponding portions is a second corresponding portion configured in such a manner that the elastic body is separated from the input-side rotating member and is in contact with the output-side rotating member.

6 Claims, 5 Drawing Sheets

DAMPER DEVICE

CROSS-REFERENCE TO RELATED APPLICATION

This application claims priority to Japanese Patent Application No. 2021-090047 filed on May 28, 2021, incorporated herein by reference in its entirety.

BACKGROUND

1. Technical Field

The present disclosure relates to damper devices.

2. Description of Related Art

A damper device is known that is interposed between a lockup piston and a turbine hub inside a torque converter to reduce torsional vibration during lockup in which the input side and the output side are directly connected. The damper device may be used outside the torque converter or may be used in other power transmission unit of a vehicle that does not use a torque converter. In the damper device, an input-side rotating member such as a retainer plate and an output-side rotating member such as an output plate are arranged at the same relative angle, and are connected via springs in the circumferential direction.

When no torque is input to the input-side rotating member, the springs are in an initial set state and are supported by both the input-side rotating member and the output-side rotating member. At this time, the outer peripheral surfaces of the ends of each spring are in contact with the ends of an inner peripheral wall of a spring housing portion and the ends of an outer peripheral wall of the spring housing portion, so that the ends of each spring are positioned in the radial direction of the input-side rotating member. The inner peripheral surfaces of the ends of each spring are in contact with both side surfaces of protruding portions of the output-side rotating member, so that the ends of each spring are positioned with respect to the output-side rotating member (see Japanese Unexamined Patent Application Publication No. 2005-282651 (JP 2005-282651 A)).

SUMMARY

When the input-side rotating member and the output-side rotating member are arranged at the same relative angle, backlash in the circumferential direction occurs in either the input-side rotating member or the output-side rotating member unless the ends of each spring are in plane contact with both the side surface of the input-side rotating member and the side surface of the output-side rotating member.

Specifically, when the ends of each spring are in contact with the side surface of the input-side rotating member and are separated from the side surface of the output-side rotating member, the input-side rotating member is supported by the springs, but the output-side rotating member is not supported by the springs. This causes backlash in the circumferential direction of the output-side rotating member. When the ends of each spring are in contact with the side surface of the output-side rotating member and are separated from the side surface of the input-side rotating member, the output-side rotating member is supported by the springs, but the input-side rotating member is not supported by the springs. This causes backlash in the circumferential direction of the input-side rotating member.

Backlash of the input-side rotating member and the output-side rotating member can be avoided if the ends of each spring can be in plane contact with both the side surface of the input-side rotating member and the side surface of the output-side rotating member. However, since the input-side rotating member and the output-side rotating member are different parts, the accuracy of alignment between the central axis of the input-side rotating member and the central axis of the output-side rotating member is low, and it is difficult for the ends of each spring to be in plane contact with both the input-side rotating member and the output-side rotating member.

The present disclosure provides a damper device that reduces backlash of an input-side rotating member and an output-side rotating member.

A damper device according to the present disclosure includes an input-side rotating member, an intermediate rotating member, an output-side rotating member, and an elastic body. An input-side rotating member is configured to be rotatable about a rotation axis. The intermediate rotating member is configured to be rotatable independently of and relative to the input-side rotating member about the rotation axis on an outer side of the input-side rotating member. The output-side rotating member is configured to be rotatable relative to the intermediate rotating member on an inner side of the intermediate rotating member. The elastic body is located in a clearance in a circumferential direction between each of a plurality of corresponding portions in which a hook portion of the input-side rotating member and a hook portion of the output-side rotating member face each other and the intermediate rotating portion. A part of the corresponding portions is a first corresponding portion configured in such a manner that the elastic body is separated from the output-side rotating member and in contact with the input-side rotating member. A remainder of the corresponding portions is a second corresponding portion configured in such a manner that the elastic body is separated from the input-side rotating member and is in contact with the output-side rotating member.

In the damper device of the above aspect, the first corresponding portion may be a portion configured in such a manner that the elastic body is separated from the output-side rotating member and in contact with the input-side rotating member in a stationary state in which the input-side rotating member is stationary. The second corresponding portion may be a portion configured in such a manner that the elastic body is separated from the input-side rotating member and in contact with the output-side rotating member in the stationary state.

In the damper device of the above aspect, the number of the first corresponding portions and the number of the second corresponding portions may be the same.

In the damper device of the above aspect, the first corresponding portions and the second corresponding portions may be located at regular interval along a circumference of the damper device.

In the damper device of the above aspect, the elastic body may include a first elastic body and a second elastic body. A first elastic body end of the first elastic body may be located at a position that achieves contact between a first main body of the first elastic body and the output-side rotating member in a rotating state in which the input-side rotating member is rotated, the first main body of the first elastic body being the first elastic body other than the first elastic body end. A second elastic body end of the second elastic body may be located at a position that achieves contact between a second main body of the second elastic body and the input-side rotating member in the rotating state, the second main body of the second elastic body being the second elastic body other than the second elastic body end.

In the damper device of the above aspect, the damper device may be mounted inside a torque converter including a lockup clutch, a lockup piston, a clutch disk, and a turbine hub, and the damper device may be located between any of the lockup clutch, the lockup piston, and the clutch disk, and the turbine hub.

According to the damper device of the present disclosure, backlash of the input-side rotating member and the output-side rotating member can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a mode for carrying out the present disclosure will be described with reference to the drawings.

Figure 1:
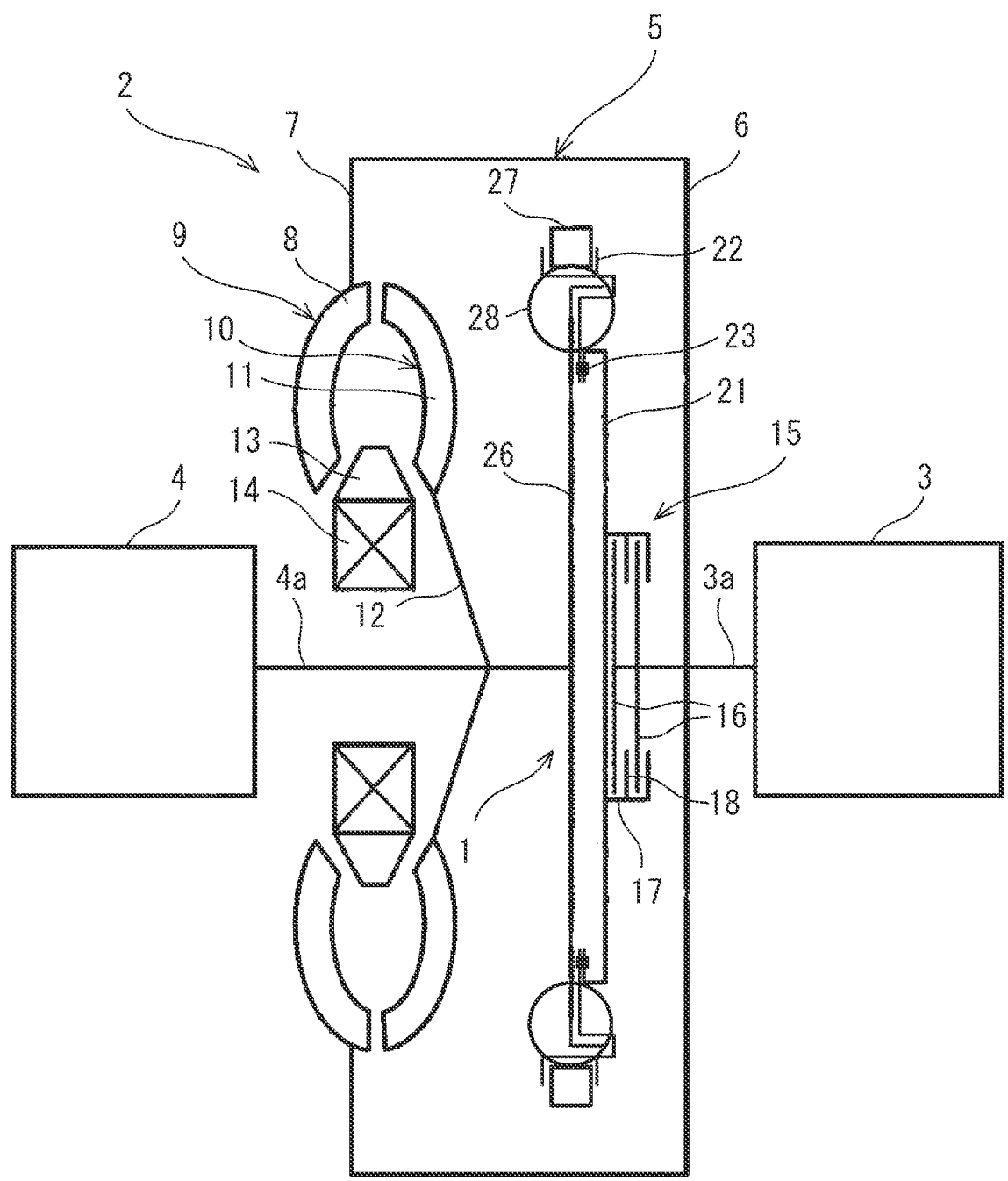
FIG. 1 is a schematic diagram of a torque converter including a damper device according to an embodiment that is an example of the present disclosure.

As shown in FIG. 1, a damper device 1 is mounted inside a torque converter 2. The damper device 1 is located in a torque transmission path between an internal combustion engine 3 and a transmission 4. The internal combustion engine 3 may be either a gasoline engine or a diesel engine. The transmission 4 may be a stepped transmission in which the gear ratio changes stepwise, or may be a continuously variable transmission in which the gear ratio changes continuously. The damper device 1 reduces vibration of torque generated by the internal combustion engine 3 and transfers the resultant torque to the transmission 4.

The torque converter 2 includes a housing 5. Oil for torque transmission is sealed in the housing 5. The housing 5 includes a front cover 6 and a pump shell 7. The front cover 6 is connected to an output shaft 3a of the internal combustion engine 3. The pump shell 7 is integral with the front cover 6. The torque converter 2 is liquid-tight by the front cover 6 and the pump shell 7.

A plurality of pump blades 8 is attached to the pump shell 7. A pump impeller 9 is formed by attaching the pump blades 8 to the pump shell 7. A turbine runner 10 is placed so as to face the pump impeller 9. The turbine runner 10 rotates as it receives an oil flow generated by the pump impeller 9. The turbine runner 10 has a shape symmetrical to the shape of the pump impeller 9. The turbine runner 10 includes a turbine shell (not shown) and a large number of turbine blades 11 attached to the inner surface of the turbine shell. The turbine runner 10 is connected to an input shaft 4a of the transmission 4 via a turbine hub 12.

A stator 13 is located between the pump impeller 9 and the turbine runner 10. The stator 13 is attached to a fixed shaft (not shown) in the torque converter 2 via a one-way clutch 14. The stator 13 changes the flow direction of oil flowing out of the turbine runner 10 when the speed ratio between the pump impeller 9 and the turbine runner 10 is low. On the other hand, when this speed ratio is high, the stator 13 does not change the flow direction of the oil as the stator 13 is pushed by the oil flowing out of the turbine runner 10 and rotates. Therefore, the one-way clutch 14 is engaged to stop rotation of the stator 13 when this speed ratio is low, and allows the stator 13 to rotate when this speed ratio is high.

A lockup clutch 15 facing the inner surface of the front cover 6 is located inside the front cover 6. The lockup clutch 15 includes a plurality of clutch discs 16 and a plurality of clutch plates 18. That is, the lockup clutch 15 is a multi-disc clutch. The clutch discs 16 are spline-fitted on a clutch hub that is integral with the front cover 6. The clutch plates 18 are arranged alternately with the clutch discs 16. The clutch plate 18 are each spline-fitted to an inner peripheral surface of a clutch drum 17 located so as to cover the outer periphery of the clutch hub.

The clutch discs 16 and the clutch plates 18 are alternately arranged between a lockup piston (not shown) and a snap ring (not shown) attached to the clutch drum 17. When the lockup piston advances and presses the clutch discs 16 and the clutch plates 18 against the snap ring, the clutch discs 16 and the clutch plates 18 are in frictional contact with each other, and torque is transferred therebetween. That is, the lockup clutch 15 is engaged so that torque is transferred.

Although not shown in the figures, a return spring is placed on the inner peripheral side of the lockup clutch 15 in the radial direction of the torque converter 2 so as to be located next to at least a part of the lockup clutch 15. The return spring presses the lockup piston in the direction of disengaging the lockup clutch 15, that is, in the direction of separating the clutch discs 16 and the clutch plates 18. As described above, the torque converter 2 includes the lockup clutch 15, the lockup piston, the clutch discs 16, and the turbine hub 12.

The damper device 1 is located between the turbine hub 12 and at least one of the following components: the lockup clutch 15, the lockup piston, and the clutch discs 16. The damper device 1 is located adjacent to the lockup clutch 15 in the direction of the rotation center axis (hereinafter, simply referred to as the rotation axis) of the torque converter 2. A disk-shaped or annular piston plate 21 is connected to the clutch drum 17 of the lockup clutch 15. An annular retainer plate 22 is connected and fixed to the piston plate 21 by rivets 23. The retainer plate 22 is an example of the input-side rotating member, and is rotatable about the rotation axis. Bolts may be used instead of the rivets 23. The piston plate 21 is located closer to the lockup clutch 15 than the retainer plate 22 in the direction of the rotation axis.

The piston plate 21 and the retainer plate 22 are located at a predetermined interval in the direction of the rotation axis. Since the piston plate 21 and the retainer plate 22 are connected to each other, the piston plate 21 and the retainer plate 22 rotate together while maintaining this interval. The piston plate 21 and the retainer plate 22 are thus located on the upstream side in the torque transfer direction. An annular intermediate plate 27 that is a separate member from the retainer plate 22 is mounted on the outer peripheral portion of the retainer plate 22. The intermediate plate 27 is an example of the intermediate rotating member, and is rotatable independently of and relative to the retainer plate 22 about the rotation axis on an outer side of the retainer plate 22.

An output plate 26 is located on the downstream side in the torque transfer direction of the piston plate 21 and the retainer plate 22 in the direction of the rotation axis. The output plate 26 is an example of an output-side rotating member, and is rotatable on an inner side of the intermediate plate 27 and relative to the intermediate plate 27. The output plate 26 is connected to the intermediate plate 27 via torsion springs 28 as elastic bodies so that the output plate 26 can rotate at a predetermined angle relative to the retainer plate 22 and the intermediate plate 27.

Figure 2:
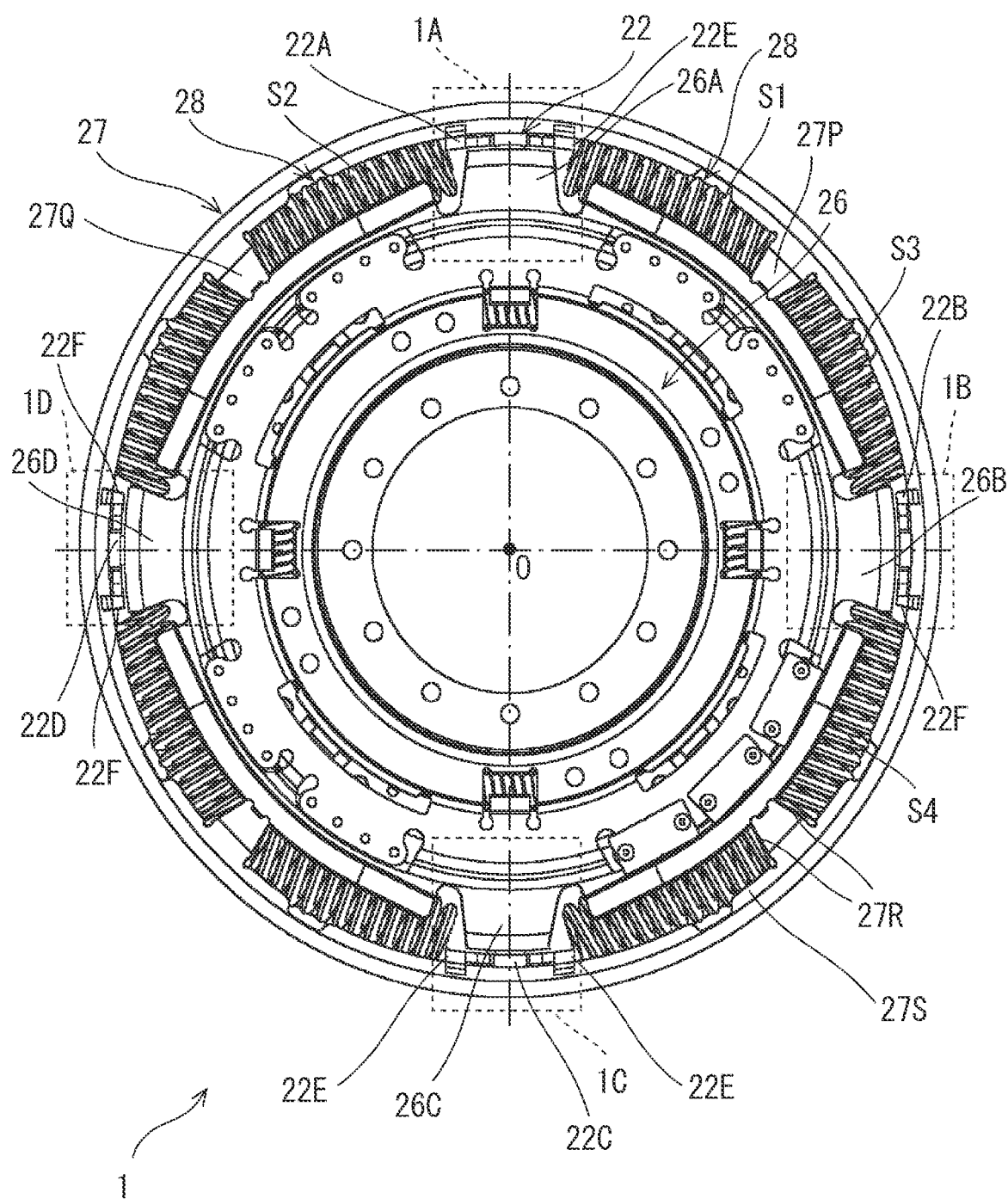
FIG. 2 is an example of a front view of the damper device.

More specifically, as shown in FIG. 2, the intermediate plate 27 surrounds the outer peripheries of the retainer plate 22 and the output plate 26. The torsion springs 28 are arranged on the inner side of the intermediate plate 27 in the circumferential direction. The intermediate plate 27 elastically connects the retainer plate 22 and the output plate 26 in the rotational direction by the torsion springs 28. The torsion springs 28 include a first torsion spring S1, a second torsion spring S2, a third torsion spring S3, a fourth torsion spring S4, etc. The first torsion spring S1 is an example of the first elastic body, and the second torsion spring S2 is an example of the second elastic body. The intermediate plate 27 operates the torsion springs 28 in series. The intermediate plate 27 can rotate relative to the retainer plate 22 and the output plate 26 while sliding independently of the rotational motion of the retainer plate 22 and the output plate 26.

The intermediate plate 27 has, in its inner periphery, four inner peripheral protruding portions including inner peripheral protruding portions 27P, 27Q at intervals of approximately 90 degrees about the rotation axis O. Spring contact portions 27R are both side surfaces in the circumferential direction of each inner peripheral protruding portion, and each spring contact portion 27R supports one of the ends of a corresponding torsion spring 28. The intermediate plate 27 has an inner peripheral flange portion 27S in its inner peripheral edge portion excluding the inner peripheral protruding portions.

The retainer plate 22 has, in its outer periphery, four outer peripheral protruding portions 22A, 22B, 22C, and 22D as hook portions at intervals of approximately 90 degrees about the rotation axis O. For example, the outer peripheral protruding portion 22A is located at an interval of 45 degrees from the inner peripheral protruding portion 27P. The remaining outer peripheral protruding portions 22B, 22C, and 22D are also located at an interval of 45 degrees from the inner peripheral protruding portions. Both side surfaces in the circumferential direction of each outer peripheral protruding portion 22A, 22C are outer peripheral spring contact portions 22E, and each outer peripheral spring contact portion 22E supports the other end of a corresponding torsion spring 28. Both side surfaces in the circumferential direction of each outer peripheral protruding portion 22B, 22D are outer peripheral spring contact portions 22F, and each outer peripheral spring contact portion 22F separates the other end of a corresponding torsion spring 28 from the outer peripheral protruding portion 22B, 22D.

Figure 4A:
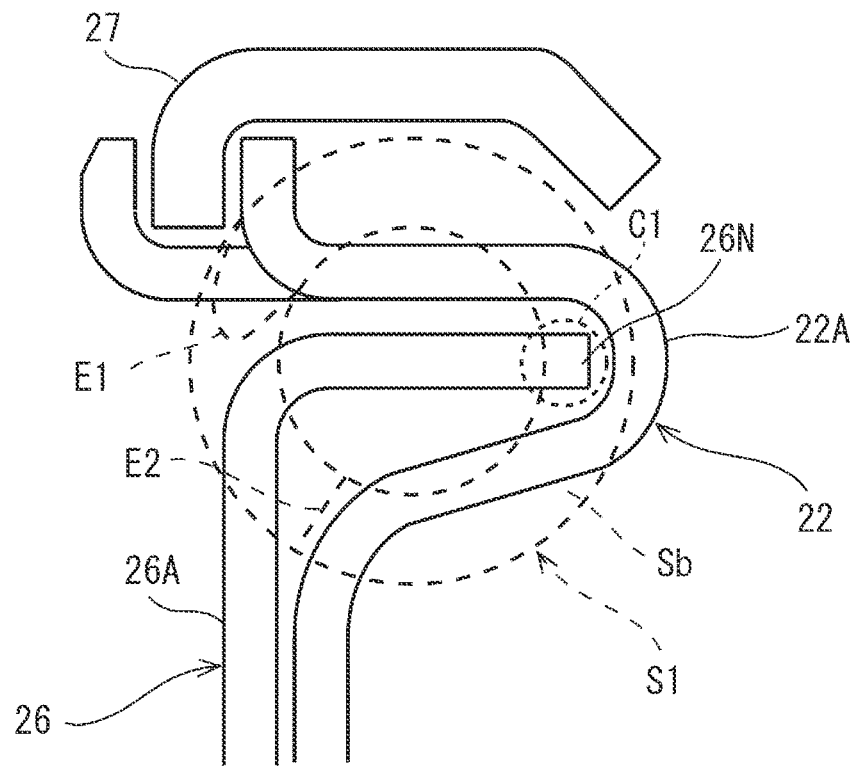
FIG. 4A illustrates an example of contact between a torsion spring and an output plate as viewed in the direction of arrow IV A shown in FIG. 3B.
Figure 4B:
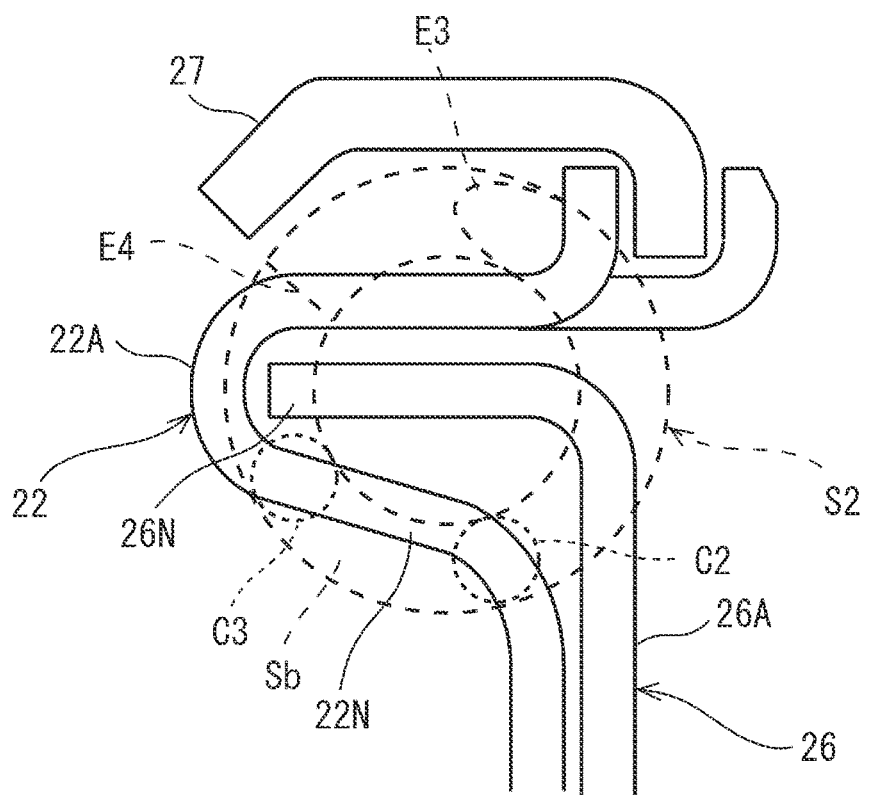
FIG. 4B illustrates an example of contact between a torsion spring and a retainer plate as viewed in the direction of arrow IV B shown in FIG. 3B.

Each of the tip ends of the outer peripheral protruding portions 22A, 22B, 22C, and 22D of the retainer plate 22 has a two-step hook, namely a tip upper hook and a tip lower hook (see also FIGS. 4A and 4B). The outer peripheral protruding portions 22A, 22B, 22C, and 22D are located on opposite sides of the piston plate 21 (see FIG. 1), and slidably hold the inner peripheral flange portion 27S of the intermediate plate 27 by the tip upper and lower hooks. The inner peripheral surface of the intermediate plate 27 other than the inner peripheral flange portion 27S supports the outer peripheral side surfaces of the torsion springs 28.

The output plate 26 has, in its outer periphery, four outer peripheral hooks 26A, 26B, 26C, and 26D as hook portions at intervals of approximately 90 degrees about the rotation axis O. The four outer peripheral hooks 26A, 26B, 26C, and 26D are provided corresponding to the four outer peripheral protruding portions 22A, 22B, 22C, and 22D of the retainer plate 22, respectively. That is, the four outer peripheral hooks 26A, 26B, 26C, and 26D and the four outer peripheral protruding portions 22A, 22B, 22C, and 22D are provided at the same relative angles, and the relative angles of the four outer peripheral hooks 26A, 26B, 26C, and 26D match the relative angles of the four outer peripheral protruding portions 22A, 22B, 22C, and 22D. The torsion spring 28 is located in the clearance in the circumferential direction between each of corresponding portions 1A, 1B, 1C, and 1D in which the four outer peripheral hooks 26A, 26B, 26C, and 26D face the four outer peripheral protruding portions 22A, 22B, 22C, and 22D, respectively, and each inner peripheral protruding portion of the intermediate plate 27. For example, the first torsion spring S1 is located in the clearance in the circumferential direction between the corresponding portion 1A and the inner peripheral protruding portion 27P. The second torsion spring S2 is located in the clearance in the circumferential direction between the corresponding portion 1A and the inner peripheral protruding portion 27Q.

In the first corresponding portions 1A, 1C that are a part of the corresponding portions 1A, 1B, 1C and 1D, the torsion springs 28 are separated from the outer peripheral hooks 26A, 26C of the output plate 26 and in contact with the outer peripheral protruding portions 22A, 22C of the retainer plate 22. For example, in the first corresponding portion 1A, both the other end of the first torsion spring S1 and the other end of the second torsion spring S2 are separated from the outer peripheral hook 26A and in contact with the outer peripheral protruding portion 22A of the retainer plate 22. As described above, in the first corresponding portion 1A, the first torsion spring S1 and the second torsion spring S2 that are in contact with the outer peripheral protruding portion 22A sandwich the retainer plate 22 therebetween even when the side surfaces in the circumferential direction of the outer peripheral protruding portion 22A and the side surfaces in the circumferential direction of the outer peripheral hook 26A are not planar. The first corresponding portion 1C is similar to the first corresponding portion 1A. Since each of the outer peripheral protruding portions 22A, 22C is thus supported by two torsion springs 28, backlash in the circumferential direction of the retainer plate 22 can be reduced.

On the other hand, in the second corresponding portions 1B, 1D that are the remainder of the corresponding portions 1A, 1B, 1C and 1D, the torsion springs 28 are separated from the outer peripheral protruding portions 22B, 22D of the retainer plate 22 and in contact with the outer peripheral hooks 26B, 26D of the output plate 26. For example, in the second corresponding portion 1B, both the other end of the third torsion spring S3 and the other end of the fourth torsion spring S4 are separated from the outer peripheral protruding portion 22B of the retainer plate 22 and in contact with the outer peripheral hook 26B of the output plate 26. As described above, in the second corresponding portion 1B as well, the third torsion spring S3 and the fourth torsion spring S4 that are in contact with the outer peripheral hook 26B sandwich the output plate 26 therebetween even when the side surfaces in the circumferential direction of the outer peripheral protruding portion 22B and the side surfaces in the circumferential direction of the outer peripheral hook 26B are not planar. The second corresponding portion 1D is similar to the second corresponding portion 1B. Since each of the outer peripheral hooks 26B, 26D is thus supported by two torsion springs 28, backlash in the circumferential direction of the output plate 26 can be reduced.

That is, backlash in the circumferential direction of both the retainer plate 22 and the output plate 26 can be reduced even when the side surfaces in the circumferential direction of the outer peripheral protruding portion 22A and the outer peripheral hook 26A, the side surfaces in the circumferential direction of the outer peripheral protruding portion 22B and the outer peripheral hook 26B, etc. are not planar. The same applies to the remaining outer peripheral protruding portions 22C, 22D and the remaining outer peripheral hooks 26C, 26D.

Figure 3A:
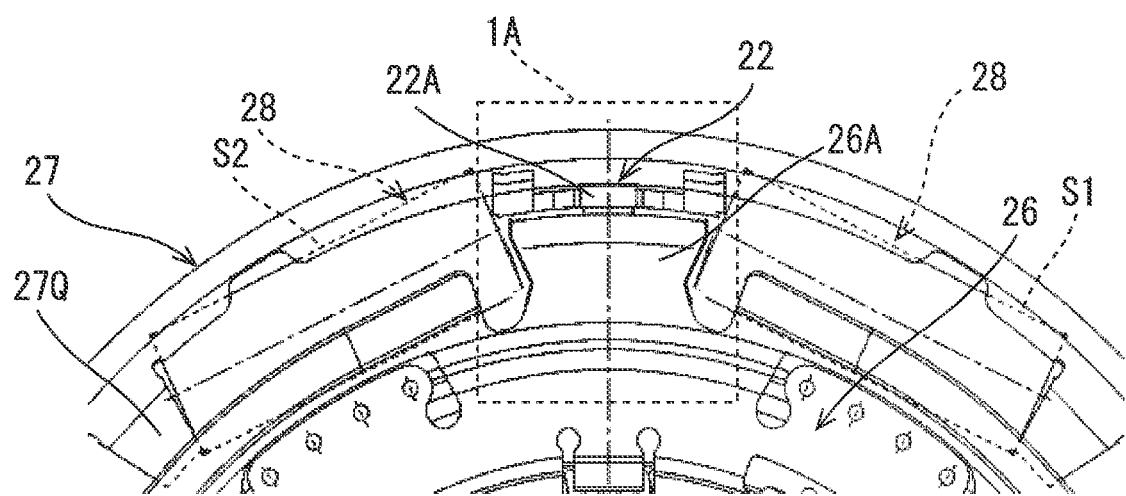
FIG. 3A is an example of a partial front view of the damper device before torque input.
Figure 3B:
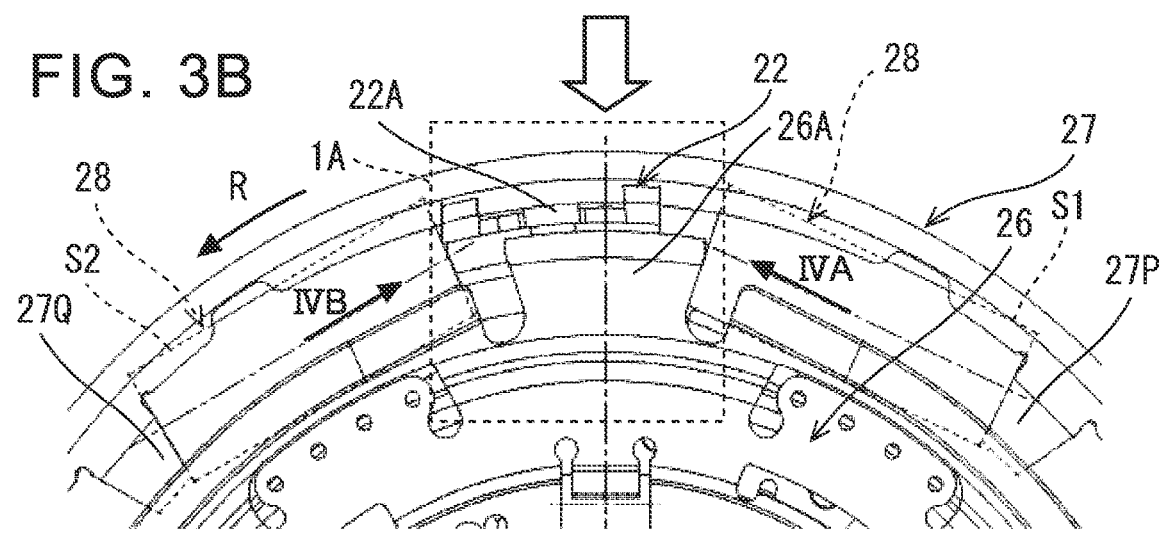
FIG. 3B is an example of a partial front view of the damper device after torque input.

When torque is input to the piston plate 21 in a stationary state in which no torque is input to the piston plate 21 and the retainer plate 22 is stationary as shown in FIGS. 2 and 3A, the state is shifted to a rotating state in which the retainer plate 22 is rotated, as shown in FIG. 3B. When shifted to the rotating state, the outer peripheral protruding portion 22A of the retainer plate 22 moves in the circumferential direction as shown by arrow R. As a result, the outer peripheral protruding portion 22A presses the second torsion spring S2. As the outer peripheral protruding portion 22A moves, the other end of the first torsion spring S1 that is in contact with the outer peripheral protruding portion 22A then comes into contact with the outer peripheral hook 26A. In FIGS. 3A and 3B, the first torsion spring S1 and the second torsion spring S2 are not illustrated in detail for better understanding of this function.

In the above rotating state, a winding end and polished end of the first torsion spring S1 according to the present embodiment are located at such positions that achieve contact between a spring body of the first torsion spring S1, that is, the first torsion spring S1 other than the winding end and the polished end, and the outer peripheral hook 26A of the output plate 26. The polished end according to the present embodiment is an end face of the torsion spring 28 polished into a plane perpendicular to the axis of the torsion spring 28.

Specifically, when the outer peripheral hook 26A is viewed from the side surface as shown by arrow IV A in FIG. 3B, the outer peripheral hook 26A of the output plate 26 is bent in the direction toward the outer peripheral protruding portion 22A as shown in FIG. 4A. A winding end E1 and polished end E2 of the first torsion spring S1 are located at first predetermined positions that achieve contact between a spring body Sb of the first torsion spring S1 and a hook edge 26N located at the tip end of the bent outer peripheral hook 26A. As a result, even when shifted to the rotating state, the spring body Sb and the hook edge 26N are in stable contact with each other as shown by broken circle C1. Accordingly, the positions of the retainer plate 22 and the output plate 26 can be stabilized as compared to the case where the winding end E1 and the polished end E2 are not located at the first predetermined positions. The spring body Sb of the first torsion spring S1 is an example of a first main body of the first elastic body, and the winding end E1 and the polished end E2 of the first torsion spring S1 are examples of the first elastic body end.

A winding end and polished end of the second torsion spring S2 according to the present embodiment are also located at such positions that achieve contact between a spring body of the second torsion spring S2 and the outer peripheral protruding portion 22A of the retainer plate 22 in the above rotating state.

Specifically, when the outer peripheral protruding portion 22A is viewed from the side surface as shown by arrow IVB in FIG. 3B, a part of the outer peripheral protruding portion 22A of the retainer plate 22 is bent in a U shape as shown in FIG. 4B. A winding end E3 and polished end E4 of the second torsion spring S2 are located at second predetermined positions that achieve contact between a spring body Sb of the second torsion spring S2 and a U-shaped part 22N that is located closer to the rotation axis than the hook edge 26N of the outer peripheral protruding portion 22A. As a result, even when shifted to the rotating state, the spring body Sb and the U-shaped part 22N are in stable contact with each other as shown by broken circles C2, C3. Accordingly, the positions of the retainer plate 22 and the output plate 26 can be stabilized as compared to the case where the winding end E3 and the polished end E4 are not located at the second predetermined positions. The spring body Sb of the second torsion spring S2 is an example of a second main body of the second elastic body, and the winding end E3 and the polished end E4 of the second torsion spring S2 are examples of the second elastic body end.

Figure 5:
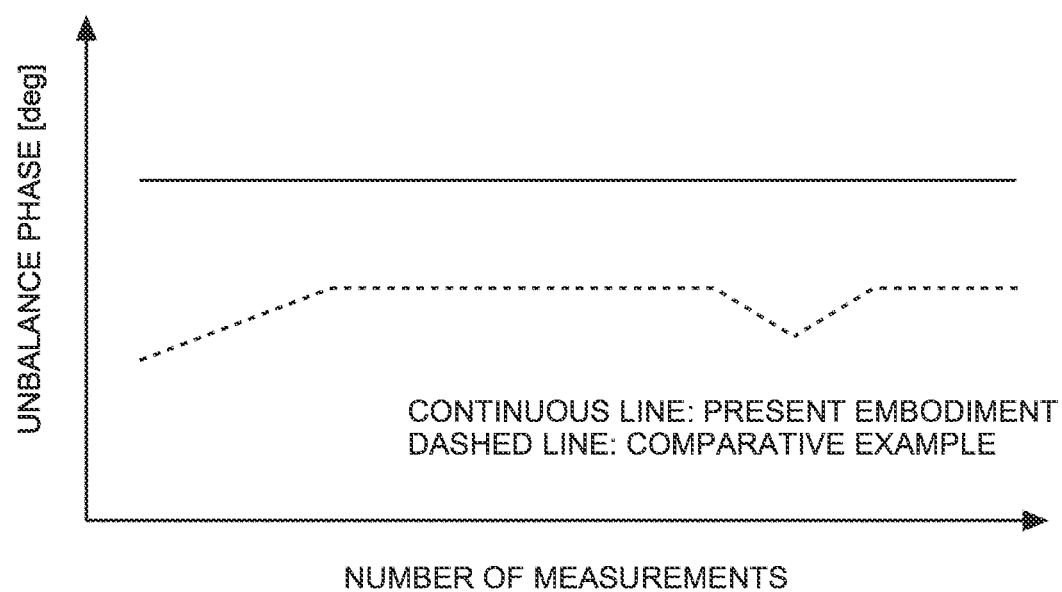
FIG. 5 is a graph illustrating the present embodiment and a comparative example.

For example, as shown by a comparative example of FIG. 5, when the winding end E1 and the polished end E2 are not located at the first predetermined positions, or when the winding end E3 and the polished end E4 are not located at the second predetermined positions, the positions of the retainer plate 22 and the output plate 26 are not stabilized and the unbalance (rotational balance) phase of the retainer plate 22 and the output plate 26 changes, depending on the number of measurements.

However, as shown by the embodiment of FIG. 5, when the winding end E1 and the polished end E2 are located at the first predetermined positions, or when the winding end E3 and the polished end E4 are located at the second predetermined positions, the positions of the retainer plate 22 and the output plate 26 are stabilized and the unbalance (rotational balance) phase of the retainer plate 22 and the output plate 26 does not change, regardless of the number of measurements.

Although the embodiment of the present disclosure is described in detail above, the present disclosure is not limited to the specific embodiment, and various modifications and variations can be made within the spirit and scope of the present disclosure described in the claims.

For example, the two first corresponding portions 1A, 1C and the two second corresponding portions 1B, 1D are described in the above embodiment. However, six outer peripheral hooks and six outer peripheral protruding portions may be provided corresponding to each other. In this case, the outer peripheral hooks and the outer peripheral protruding portions are located at intervals of 60 degrees, and the number of first corresponding portions and the number of second corresponding portions can be the same, namely three. In the above embodiment, the damper device 1 is mounted inside the torque converter 2. However, for example, the damper device 1 may be mounted outside the torque converter 2 or may be mounted in other power transmission unit of a vehicle that does not use the torque converter 2.

What is claimed is:
1. A damper device comprising:
an input-side rotating member configured to be rotatable about a rotation axis;

an intermediate rotating member configured to be rotatable independently of and relative to the input-side rotating member about the rotation axis on an outer side of the input-side rotating member;

an output-side rotating member configured to be rotatable relative to the intermediate rotating member on an inner side of the intermediate rotating member; and an elastic body located in a clearance in a circumferential direction between each of a plurality of corresponding portions, in which a hook portion of the input-side rotating member and a hook portion of the output-side rotating member face each other, and the intermediate rotating member, wherein a part of the corresponding portions are first corresponding portions configured in such a manner that the elastic body is separated from the output-side rotating member and in contact with the input-side rotating member, and a remainder of the corresponding portions are second corresponding portions configured in such a manner that the elastic body is separated from the input-side rotating member and is in contact with the output-side rotating member.

2. The damper device according to claim 1, wherein:

the first corresponding portions are each a portion configured in such a manner that the elastic body is separated from the output-side rotating member and in contact with the input-side rotating member in a stationary state in which the input-side rotating member is stationary; and the second corresponding portions are each a portion configured in such a manner that the elastic body is separated from the input-side rotating member and in contact with the output-side rotating member in the stationary state.

3. The damper device according to claim 1, wherein the number of the first corresponding portions and the number of the second corresponding portions are the same.

4. The damper device according to claim 1, wherein the first corresponding portions and the second corresponding portions are located at regular intervals along a circumference of the damper device.

5. The damper device according to claim 1, wherein:

the elastic body includes a first elastic body and a second elastic body, a first elastic body end of the first elastic body is located at a position that achieves contact between a first main body of the first elastic body and the output-side rotating member in a rotating state in which the input-side rotating member is rotated, the first main body of the first elastic body being the first elastic body other than the first elastic body end, and a second elastic body end of the second elastic body is located at a position that achieves contact between a second main body of the second elastic body and the input-side rotating member in the rotating state, the second main body of the second elastic body being the second elastic body other than the second elastic body end.

6. The damper device according to claim 1, wherein: the damper device is mounted inside a torque converter including a lockup clutch, a lockup piston, a clutch disk, and a turbine hub; and the damper device is located between any of the lockup clutch, the lockup piston, and the clutch disk, and the turbine hub.

\* \* \* \* \*